United States Patent
Tsuchiya et al.

(10) Patent No.: US 8,029,952 B2
(45) Date of Patent: Oct. 4, 2011

(54) MAGNETIC RECORDING MEDIUM, METHOD FOR MANUFACTURING THE SAME, AND MAGNETIC RECORDING/REPRODUCING APPARATUS

(75) Inventors: Yuko Tsuchiya, Tokorozawa (JP); Chiseki Haginoya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 189 days.

(21) Appl. No.: 11/984,278

(22) Filed: Nov. 15, 2007

(65) Prior Publication Data
US 2008/0204934 A1    Aug. 28, 2008

(30) Foreign Application Priority Data
Feb. 22, 2007 (JP) ................. 2007-042546

(51) Int. Cl.
G03G 21/00 (2006.01)
G03G 13/00 (2006.01)
G11B 5/65 (2006.01)
(52) U.S. Cl. .......... 430/22; 430/30; 430/320; 428/848.1
(58) Field of Classification Search ............. 428/848.2, 428/842.1, 848.5, 848.1, 847.5, 827; 360/17, 360/15, 55; 427/259, 128; 438/551; 216/22; 430/320, 270.1, 296, 22, 30, 322, 33, 312
See application file for complete search history.

(56) References Cited

U.S. PATENT DOCUMENTS

| | | | |
|---|---|---|---|
| 2001/0023045 A1* | 9/2001 | Pierrat et al. | 430/296 |
| 2002/0081461 A1* | 6/2002 | Nishikawa et al. | 428/842.1 |
| 2002/0089769 A1* | 7/2002 | Ishida et al. | 360/17 |
| 2002/0168839 A1* | 11/2002 | Yanagi et al. | 438/551 |
| 2004/0101713 A1* | 5/2004 | Wachenschwanz et al. | 428/842 |
| 2004/0173568 A1* | 9/2004 | Hattori | 216/22 |
| 2005/0094298 A1* | 5/2005 | Sakurai et al. | 360/15 |

(Continued)

FOREIGN PATENT DOCUMENTS
GB    2 217 467 A    10/1989
(Continued)

OTHER PUBLICATIONS

Murakami (JP 2000-98120) Apr. 7, 2000—machine translation.*

(Continued)

*Primary Examiner* — Kevin M. Bernatz
*Assistant Examiner* — Louis Falasco
(74) *Attorney, Agent, or Firm* — Stites & Harbison PLLC; Juan Carlos A. Marquez, Esq.

(57) ABSTRACT

There is provided a method for fabricating a magnetic recording medium that provides high throughput, low manufacturing cost, and no degradation in accuracy in pattern size in fine pattern formation. A resist layer is formed on a substrate or cutting work layer. The surface of the substrate is divided into two or more areas using the center of rotation of the substrate as a reference point. An optical, contactless pattern transfer method is used to transfer a figure pattern contained in the divided area through a mask to the resist layer so as to form a latent image of the figure pattern. The pattern transfer is similarly carried out for the divided area. After the pattern transfer processes for all the divided areas are completed, the entire resist layer is developed to form a resist pattern. The resist pattern is used as a mask to cut the substrate or cutting work layer. As a result, there is provided the substrate or cut work layer onto which a fine pattern has been transferred.

5 Claims, 9 Drawing Sheets

U.S. PATENT DOCUMENTS

| | | | |
|---|---|---|---|
| 2005/0106480 A1* | 5/2005 | Suwa | 430/30 |
| 2005/0233178 A1* | 10/2005 | Sugimoto et al. | 427/128 |
| 2005/0271819 A1* | 12/2005 | Wago et al. | 427/259 |
| 2006/0012905 A1* | 1/2006 | Okino et al. | 360/15 |
| 2006/0056091 A1* | 3/2006 | Nagano et al. | 360/55 |
| 2006/0093863 A1* | 5/2006 | Tsuchiya et al. | 428/827 |
| 2007/0026325 A1* | 2/2007 | Derksen et al. | 430/30 |
| 2007/0031743 A1* | 2/2007 | Bijnen et al. | 430/22 |

FOREIGN PATENT DOCUMENTS

| | | |
|---|---|---|
| JP | 2-5568 | 1/1990 |
| JP | 2000-098120 | 4/2000 |
| JP | 2005-108361 | 4/2005 |
| JP | 2006-127681 | 5/2006 |

OTHER PUBLICATIONS

Kazuhiro Hattori et al., "Fabrication of Discrete Track Perpendicular Media for High Recording Density", IEEE Transactions on Magnetics, vol. 40, No. 4, Jul. 2004, pp. 2510-2515.

David Wachenschwanz et al., "Design of a Manufacturable Discrete Track Recording Medium", IEEE Transactions on Magnetics, vol. 41, No. 2, Feb. 2004, pp. 670-675.

Office Action from Japanese Patent Office in the corresponding Japanese Application No. 2007-042546, mailed Mar. 30, 2010 in Japanese.

\* cited by examiner (prior art)

(prior art)

(prior art)

(prior art)

MAGNETIC RECORDING MEDIUM, METHOD FOR MANUFACTURING THE SAME, AND MAGNETIC RECORDING/REPRODUCING APPARATUS

CLAIM OF PRIORITY

The present application claims priority from Japanese application JP 2007-042546 filed on Feb. 22, 2007, the content of which is hereby incorporated by reference into his application.

BACKGROUND OF THE INVENTION

1. Field of the Invention

The present invention relates to a magnetic recording medium used in a magnetic disk apparatus and the like, a method for manufacturing the magnetic recording medium, and a magnetic recording/reproducing apparatus using the magnetic recording medium.

2. Background Art

In recent years, the recording density of magnetic recording media has been improved as the capacity of magnetic recording/reproducing apparatuses has increased. In the last few years, there has been commercialized a magnetic recording/reproducing apparatus that employs a perpendicular magnetic recording method in which the magnetized state, which could be problematic in high-density magnetic recording, is substantially insensitive to thermal unstableness (superparamagnetic effect) to achieve a recording density of 100 to 200 Gb/in$^2$. To achieve a higher recording density of 200 Gb/in$^2$ or higher, the recording medium itself needs improvement. The current recording medium is called a medium which has a continuous magnetic recording layer, in which each layer that forms the medium is formed by sputtering on the entire substrate in a uniform manner. When the recording density is 200 Gb/in$^2$ or higher, a fringe magnetic field leaked from the side surfaces of the magnetic recording head frequently causes data to be written to adjacent data tracks, resulting in degradation of recorded information in the magnetic form. Furthermore, when the reproducing head is used to read information in the magnetic form on a data track, leakage flux from adjacent tracks reduces the S/N ratio. To avoid such phenomena and further improve the recording density, there has been proposed a discrete track medium having no magnetic recording layer between a data track having magnetic information and the adjacent data track, as shown in FIG. 1. In FIG. 1, reference numeral 11 denotes a substrate. Reference numeral 12 denotes a soft magnetic underlayer. Reference numeral 13 denotes an intermediate layer. Reference numeral 14 denotes a data track. Reference numeral 15 denotes a groove between data tracks. Reference numeral 16 denotes the cross-track direction.

In an even higher recording density of 500 Gb/in$^2$ to 1 Tb/in$^2$, there has been devised a dot-patterned medium in which not only adjacent recording tracks are magnetically separated but also adjacent recording bits formed in the same recording track are magnetically separated. FIG. 2 shows a dot-patterned medium. In FIG. 2, reference numeral 21 denotes a substrate. Reference numeral 22 denotes a soft magnetic underlayer. Reference numeral 23 denotes an intermediate layer. Reference numeral 24 denotes a recording bit. Reference numeral 25 denotes a groove between recording bits. Reference numeral 26 denotes the cross-track direction.

Unlike the conventional magnetic recording medium having a flat structure, the discrete track medium and the dot-patterned medium are sometimes collectively referred to as a patterned medium meaning that they include a fine pattern having an indented structure. The indented structure herein means, as shown in FIGS. 1 and 2, that a microprocessed indented structure is formed somewhere on the substrate or in the soft magnetic underlayer, the intermediate layer, or the magnetic recording layer stacked on the substrate. Alternatively, the indented structure may be an indented structure followed by planarization. Thus forming such an indented structure causes magnetic separation or non-uniformity between adjacent recording tracks or between recording bits.

The fine pattern having an indented structure includes a concentric or spiral discrete track structure or a dot pattern that magnetically separates adjacent recording bits formed on the same recording track, the discrete track structure and recording bits being used to record and reproduce magnetic information in a data area. The fine pattern desirably also includes a servo pattern in a servo area used in servo control of the recording/reproducing head. The patterned medium can be defined as a medium having a microprocessed indented structure formed either in the data area in which magnetic information is recorded or the servo area in which servo information for the recording/reproducing head is written so as to cause magnetic separation or non-uniformity. Therefore, a medium having a flat data area as in the conventional magnetic recording medium is still regarded as a patterned medium, when the medium has a microprocessed indented structure and hence a magnetically intermittent or non-uniform area in the pattern in the servo area used in servo control of the recording/reproducing head.

Patterned media are broadly classified into two types in terms of their structures, as shown in FIGS. 3 and 4. FIG. 3 shows an example of one of the structures, a patterned medium with patterns on a substrate surface in which a fine pattern is directly formed in a substrate 31 and various magnetic films are staked thereon. In FIG. 3, reference numeral 32 denotes a soft magnetic underlayer. Reference numeral 33 denotes an intermediate layer. Reference numeral 34 denotes a magnetic recording layer. Reference numeral 35 denotes a data track. Reference numeral 36 denotes the pitch between data tracks. Other structure has a patterned indented structure in a metallic layer or a nonmetallic layer stacked on the substrate. FIG. 4 shows an example of a patterned medium with patterns on a magnetic recording layer, in which the flat magnetic recording layer formed on the substrate is microprocessed into dots or discrete tracks. In FIG. 4, reference numeral 41 denotes a substrate. Reference numeral 42 denotes a soft magnetic underlayer and an intermediate layer. Reference numeral 43 denotes a magnetic recording layer left after a cutting process (projections corresponding to data tracks or recording bits). Reference numeral 44 denotes an indentation in the cut magnetic recording layer (corresponding to the portion between data tracks or the portion between recording bits). Reference numeral 45 denotes nonmagnetic material filled in an indentation.

As an example of how to fabricate a fine pattern in a patterned medium, IEEE Trans. Magn. Vol. 40, No. 4, 2510 (2004) discloses a method for forming a fine pattern by using a resist pattern (reference numeral 55) fabricated through electron beam lithography as a mask and cutting (56) a magnetic recording layer 54 to form a fine pattern, as shown in FIGS. 5A to 5C. In FIGS. 5A to 5C, reference numeral 51 denotes a substrate. Reference numeral 52 denotes a soft magnetic underlayer. Reference numeral 53 denotes an intermediate layer. Reference numeral 54 denotes the magnetic recording layer. Reference numeral 55 denotes the resist pattern fabricated through electron beam lithography. Reference numeral 56 denotes the cutting process. Reference numeral 57 denotes the magnetic recording layer cut into a patterned indented structure. Reference numeral 58 denotes a data track or a recording bit. The resist pattern indicated by reference numeral 55 in FIGS. 5A and 5B may be formed through a nanoimprinting method in some cases.

IEEE Trans. Magn. Vol. 41, No. 2, 670 (2005) discloses an example of how to fabricate a patterned medium with patterns on a substrate surface. As shown in FIGS. 6A to 6D, the method includes the steps of fabricating a resist pattern 62 on a substrate 61 through electron beam lithography, using the resist pattern 62 as a mask to form a fine pattern 64 in the substrate surface through reactive ion etching indicated by reference numeral 63, and stacking a soft magnetic underlayer 65, an intermediate layer 66, and a magnetic recording layer 67 on the fine pattern 64 in a uniform manner. A patterned medium having the structure shown in FIG. 6D is thus provided. In FIG. 6D, reference numeral 68 denotes a data track or a recording bit.

SUMMARY OF THE INVENTION

In the patterned media disclosed in IEEE Trans. Magn. Vol. 40, No. 4, 2510 (2004) and IEEE Trans. Magn. Vol. 41, No. 2, 670 (2005), as shown in FIGS. 5A to 5C and 6A to 6D, the fine pattern, which is formed of a servo pattern used in positional control and recording/reproducing control of the head as well as a data track pattern for writing and reading magnetic information, is fabricated by fabricating a resist pattern through electron beam lithography, and using the resist pattern as a mask to cut the magnetic recording layer or the substrate. Even when the resist pattern is formed through a nanoimprinting method, a fine pattern on a nanoimprinting mold is fabricated through electron beam lithography.

Electron beam lithography is an optimum method for fabricating a fine pattern having a pattern size of several tens to several hundreds of nanometers and widely used in experimental applications. Electron beam lithography systems are classified into two types in terms of how to move the stage, the XY type in which the stage moves in two axial directions perpendicular to each other, and the Xθ type in which the stage rotates and moves in a fixed direction. When a fine pattern is fabricated on a substrate having the center of rotation, such as a hard disk substrate and an optical disk substrate, the drawing time when an Xθ electron beam lithography system is used is believed to be typically ⅔ to ½ the drawing time when an XY electron beam lithography system is used. Therefore, with a view to achieving volume production, an Xθ electron beam lithography system, which can reduce the drawing time, is expected to be used for fabrication of a fine pattern on a disk-shaped substrate, such as a hard disk substrate.

In electron beam lithography, a desired figure pattern is obtained by focusing the drawing electron beam into a spot having a diameter of several tens of nanometers and combining the electron beam scanning and the movement of the stage of the electron beam lithography system to seamlessly write a pattern across the drawing area. To fabricate a discrete track pattern or a dot pattern in the data area, and a servo pattern on the entire surface of a 2.5 or 1.8-inch diameter hard disk substrate in electron beam lithography, the electron beam drawing time is expected to be approximately one day to one week per substrate even when an Xθ electron beam lithography system is used, although depending on the resist sensitivity, the size of the fine pattern, the area size of the drawing area, and the moving speed of the stage. Therefore, the throughput of substrate fabrication will be significantly poor when an electron beam lithography system is used to form a fine pattern.

In a hard disk drive, the type and the shape of the servo pattern as well as the arrangement of the servo area on the substrate are part of important factors that determine the performance of the drive, so that the servo pattern is frequently changed in an attempt to improve the recording density and the performance of the hard disk drive. In the case of a hard disk drive, there has been no standardization activity of the servo pattern, so that each hard disk drive manufacturer has its own standard, which is even tailored to each model in many cases. Therefore, to change a servo pattern, it is necessary to change a program, called a pattern generator (or a formatter), and a pattern generation circuit required when an Xθ electron beam lithography system is used to draw a servo pattern. It takes time to change a pattern generator and the changed pattern generator is dedicated to each model of each manufacturer, resulting in an increased patterned medium manufacturing cost.

As a method for manufacturing a patterned medium in volume, there have been studies on fine pattern transfer using a nanoimprinting method. In a nanoimprinting method, fine pattern formation requires an imprinting mold having a pattern having the same size as that of a desired fine pattern. Electron beam lithography is primarily used to fabricate the mold, but fabrication of a fine pattern on the mold by electron beam drawing is time-consuming as described above, possibly resulting in an expensive mold and hence an increased patterned medium manufacturing cost.

When a highly sensitive chemically amplified resist capable of reducing the drawing time is used in electron beam lithography, there is a known delay effect by which the pattern size and resolution at the electron beam drawing start point differ from those at the electron beam drawing end point even when a fine pattern having the same size thereacross is drawn. As described above, in electron beam lithography, it is expected that it takes several days to fabricate a fine pattern on the entire surface of one substrate, resulting in degradation in accuracy in pattern size due to the delay effect.

An object of the present invention is to provide a method for manufacturing a magnetic recording medium that provides high throughput, low manufacturing cost, and no degradation in accuracy in pattern size in fine pattern formation. Another object of the present invention is to provide a patterned medium for magnetic recording and thermally or optically assisted magnetic recording using the method for manufacturing a magnetic recording medium. Still another object of the present invention is to provide a magnetic recording/reproducing apparatus using the magnetic recording medium.

The method for manufacturing a magnetic recording medium including a magnetic recording layer having a patterned indented structure according to the present invention includes the steps of forming a resist layer on a disk-shaped substrate having the center of rotation or a cutting work layer including a metallic layer or a nonmetallic layer formed on the substrate; dividing the surface of the substrate into a plurality of divided areas using the center of rotation as a reference point and sequentially transferring latent images of patterns formed on masks to the resist layers in the divided areas using an optical, contactless pattern transfer method, the patterns on the masks being patterns in data and servo areas corresponding to the divided areas; developing the resist layers to form a resist pattern over the resist layers; and using the resist pattern as a mask to cut the surface of the substrate or the cutting work layer formed on the substrate. The terminal pattern of the data area is formed in an end area of one of two divided areas adjacent in the circumferential direction of the substrate, the end area being adjacent to the other divided area, and the start pattern of the servo area is formed in an end area of the other divided area, the end area being adjacent to the one divided area. It is preferable to form patterns in adjacent end areas of two divided areas adjacent in the circumferential direction of the substrate, the patterns detecting the amount of shift in the radial direction of the substrate between patterns connected across the boundary between the two divided areas.

In the thus fabricated magnetic recording medium according to the present invention, the magnetic recording layer having the patterned indented structure is formed on the disk-shaped substrate having the center of rotation. The surface of the substrate is divided into the plurality of divided areas using the center of rotation as the reference point, and patterns are connected in a discontinuous manner at the boundary between two divided areas adjacent in the circumferential direction of the substrate. The terminal pattern of the data area is formed in an end area of one of two divided areas adjacent in the circumferential direction of the substrate, the end area being adjacent to the other divided area, and the start pattern of the servo area is formed in an end area of the other divided area, the end area being adjacent to the one divided area.

According to the present invention, there is provided a method for manufacturing a magnetic recording medium that provides high throughput, low manufacturing cost, no degradation in accuracy in pattern size, and reduced pattern defects in fine pattern formation. The method for manufacturing a magnetic recording medium of the present invention is used to provide a patterned medium for magnetic recording and thermally or optically assisted magnetic recording. The magnetic recording medium is used to provide a large-capacity magnetic recording/reproducing apparatus.

DETAILED DESCRIPTION OF THE PREFERRED EMBODIMENTS

Figure 7:
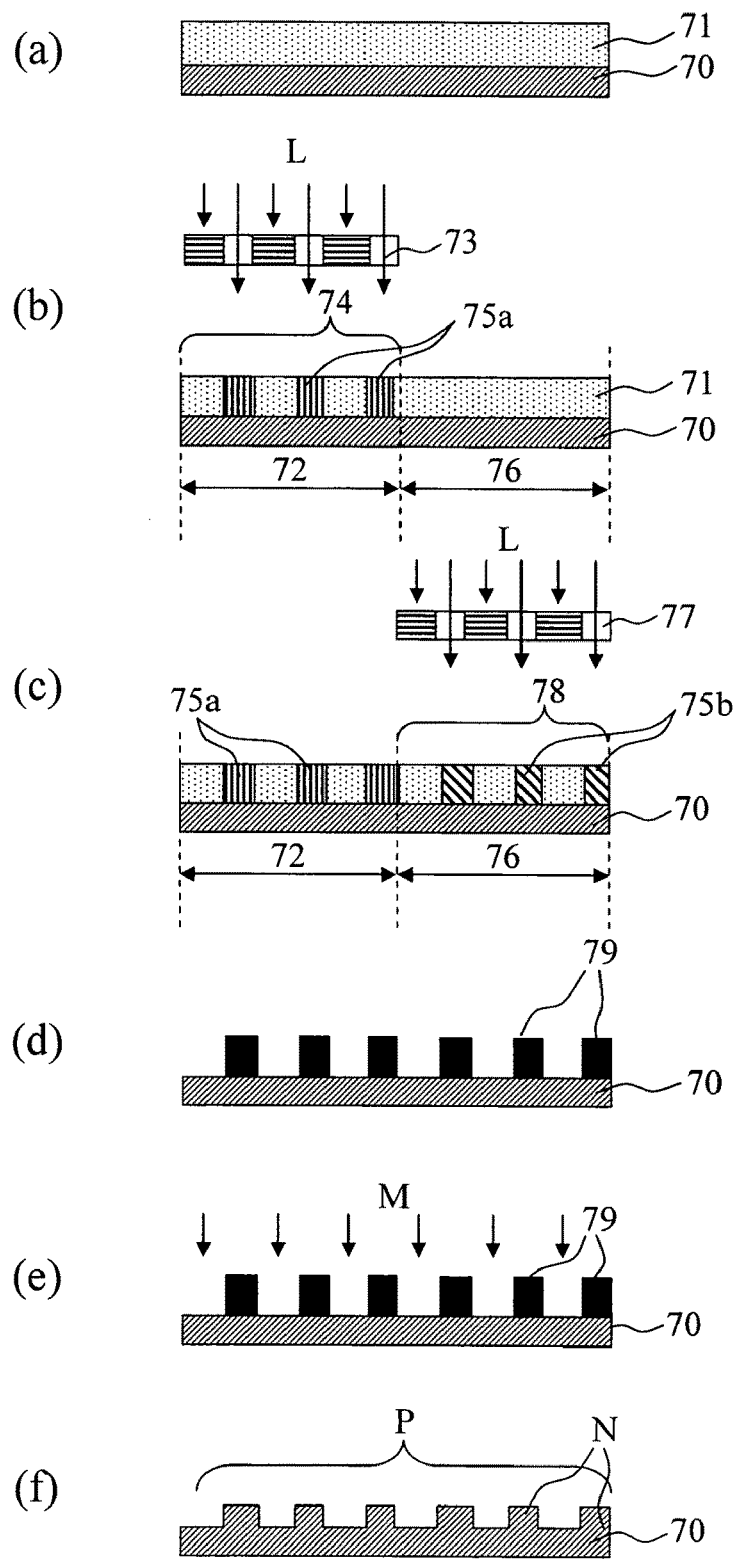
FIGS. 7A to 7F are schematic views showing the method for manufacturing a magnetic recording medium of the present invention.

The method for manufacturing a magnetic recording medium according to the present invention will be schematically described with reference to FIGS. 7A to 7F. As shown in FIG. 7A, a resist layer 71 is formed on a substrate or a cutting work layer 70. Then, the surface of the substrate is divided into two or more arbitrary areas using the center of rotation of the substrate as a reference point. The dividing method will be described later in detail with reference to FIG. 8. Then, as shown in FIGS. 7B and 7C, an optical, contactless pattern transfer method is used to transfer the pattern in the data area in which magnetic information is recorded and the pattern in the servo area having servo information for the recording/reproducing head to be created in each of the divided areas through a mask including figure patterns corresponding to these patterns to the resist layer in each of the divided areas on the substrate that corresponds to the mask in such a way that the latent images of the figure patterns are separately transferred for each mask. In FIG. 7B, first for the divided area 72, the optical, contactless pattern transfer method L is used to transfer the figure patterns corresponding to the data area and the servo area in the divided area 72 through the mask 73 including the figure patterns to the resist layer 74 corresponding to the divided area 72 in such a way that the latent images 75a of the figure patterns are formed. Then, as shown in FIG. 7C, similarly for the divided area 76, the mask 77 is used to form the latent images 75b of the figure patterns in the resist layer 78 corresponding to the divided area 76. After the pattern transfer processes for all the divided areas are completed, the entire resist layer 71 is developed to form a resist pattern 79 from the latent images of the figure patterns, as shown in FIG. 7D. Then, as shown in FIG. 7E, the resist pattern 79 is used as a mask to cut (M) the substrate or the cutting work layer 70. As a result, there is provided a substrate or a cut work layer P to which a fine pattern N has been transferred, as shown in FIG. 7F. Although the number of divided areas is two in FIGS. 7A to 7F, it can be any of other numbers.

The substrate can be a 2.5-inch diameter hard disk substrate or a 1.8-inch diameter hard disk substrate. Alternatively, a 1-inch diameter or 0.85-inch diameter hard disk substrate can be used. Still alternatively, substrates other than hard disk substrates can be used as long as they are disk-like substrates having the center of rotation. The material of the substrate is desirably any of various types of glass, and glass on which an $SiO_2$ layer or an SiN layer is formed by sputtering. Silicon monocrystal and silicon polycrystal having a naturally-oxidized film, a thermally-oxidized film, or a nitride film thereon can also be used. Substrates made of other materials can also be used. The substrate may be optically transparent or optically opaque.

In the present invention, the magnetic recording medium on which a pattern is formed desirably has a structure having a soft magnetic underlayer, an intermediate layer, and a perpendicular magnetic recording layer sequentially stacked on the substrate. Alternatively, a medium having a structure with a nonmagnetic layer stacked on the perpendicular magnetic recording layer can be used. When the layer indicated by reference numeral 70 is a cutting work layer formed on the substrate, it is conceivable to use a magnetic recording layer as the cutting work layer. In this case, the magnetic recording layer is desirably formed of a film containing at least one of the elements of Fe, Co, Cr, Pt, Pd, Si, and O and having perpendicular magnetic anisotropy with respect to the substrate surface. A film containing other elements and having perpendicular magnetic anisotropy can also be used. A magnetic recording layer having a multilayer structure at least including a ferromagnetic film having high coercivity (hard film) and further including a soft magnetic film or an antiferromagnetic film can also be used. A film having in-plane magnetic anisotropy can also be used.

The cutting work layer may include the intermediate layer as well as the magnetic recording layer. In this case, the intermediate layer can be made of an optimum element and have an optimum film thickness according to the group of elements and the crystal structure of the magnetic recording layer.

The cutting work layer may include the magnetic recording layer, the intermediate layer, and the soft magnetic underlayer. The soft magnetic underlayer desirably contains at least one of the elements of Fe, Co, Ni, Ta, and Zr. A soft magnetic underlayer containing other elements can be used. The soft magnetic underlayer can be formed of a single-layer film having a specific composition. It is known that the soft magnetic underlayer has a large number of magnetic domains, and it is important to control these magnetic domains to reduce medium-related noise. To this end, the soft magnetic underlayer in the medium of the present invention can be formed by stacking a plurality of magnetic films having compositions different from one another. For example, the soft magnetic underlayer can include an antiferromagnetic film, a ferromagnetic film and the like to control the magnetic domains.

The cutting work layer can be the intermediate layer alone or the soft magnetic underlayer alone. Instead, the cutting work layer can be a nonmagnetic layer, such as an alumina layer and an $SiO_2$ layer, formed on the magnetic recording layer or at an arbitrary position between the substrate and the magnetic recording layer.

In FIGS. 7A to 7F, the shape of the fine pattern in the data area in which magnetic information is recorded desirably has a concentric or spiral discrete track structure having an indented structure in which the projection corresponds to a data track and the indentation corresponds to the portion between adjacent data tracks. The shape of the fine pattern may be a dot-patterned structure having an indented structure in which adjacent recording bits formed on the same recording track are magnetically separated, the projection and the indentation corresponding to a recording bit and the portion between recording bits, respectively.

In FIGS. 7A to 7F, the pattern used in the servo area in which servo information for the recording/reproducing head is recorded is desirably a typical servo pattern formed of a pre-amble for creating a clock signal, a gray code and a sector code for specifying the track number and the sector number, and burst patterns used for positioning the recording/reproducing head. Barber-pole patterns in a phase servo system can also be used.

The optical, contactless pattern transfer method is desirably ArF photolithography using an ArF excimer laser having a wavelength of 193 nm as a light source, or KrF photolithography using a KrF excimer laser having a wavelength of 248 nm as a light source. Lithography using light having other wavelengths, such as extreme ultraviolet (EUV) light and X rays, can be applied. Lithography using white light, which is light having a plurality of wavelengths mixed, instead of monochrome light as a light source can also be used.

When ArF or KrF lithography is used, it is desirable that the figure patterns on the masks 73 and 77 are substantially similar to the resist pattern 79 to be formed in the resist layer and have a size four times larger than that of the resist pattern 79. The ratio of the size of each of the figure patterns to that of the resist pattern can be not only four but also one or five or larger. When ArF or KrF lithography is used, the mask used in separate exposure can be fabricated with an electron beam lithography system or a laser beam recorder (LBR), as in a photolithography mask used in fine pattern fabrication for semiconductors.

The cutting method can be focused ion beam using Ga ions, reactive ion etching, or Ar ion milling. The cutting method can be optimized by the substrate or the cutting work layer. When the cutting work layer is a permalloy (FeNi) film or a soft magnetic film primarily containing the elements of Fe, Ni, and Co, the cutting method is desirably reactive ion etching using a mixture gas of CO or $CO_2$ and $NH_3$. When the cutting work layer is the intermediate layer or the magnetic recording layer, the cutting method is desirably focused ion beam or Ar ion milling. When the cutting work layer is an alumina film or an $SiO_2$ film, it is desirable to use reactive ion etching using a chlorine- or fluorine-based halogen gas.

Figure 8:
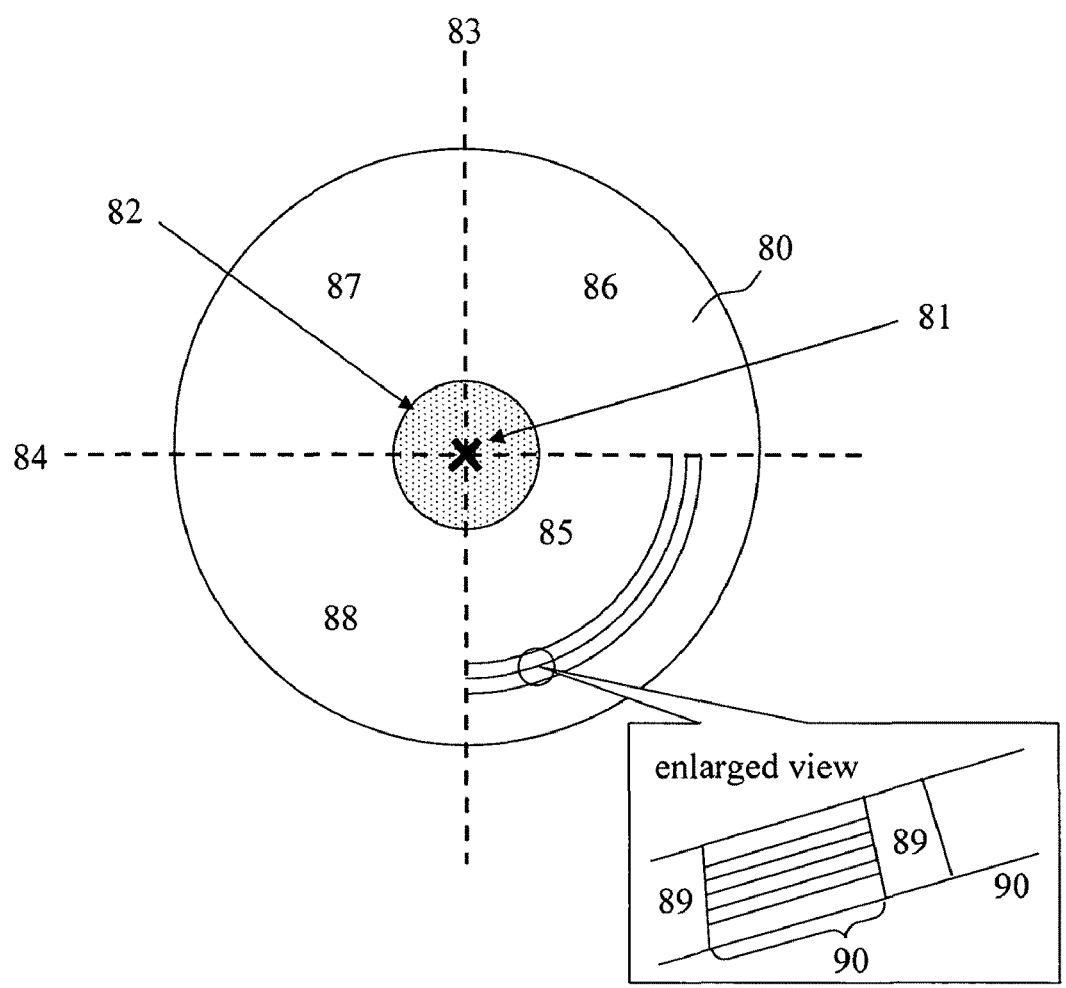
FIG. 8 is a schematic view showing a dividing method in the method for manufacturing a magnetic recording medium of the present invention.

The dividing method in the method for manufacturing a magnetic recording medium of the present invention will be described in detail with reference to FIG. 8. FIG. 8 shows a concept of the divided areas in a 2.5-inch or 1.8-inch hard disk medium. In FIG. 8, reference numeral 80 denotes the 2.5-inch or 1.8-inch hard disk medium. Reference numeral 81 denotes the center of rotation. Reference numeral 82 denotes a HUB hole through which a rotating shaft is inserted. Reference numeral 83 denotes a dividing line 1. Reference numeral 84 denotes a dividing line 2. Reference numeral 85 denotes a divided area 1 formed by the dividing lines 1 and 2. Reference numerals 86 to 88 denote divided areas 2 to 4, respectively. Reference numeral 89 denotes the servo area in the divided area 1. Reference numeral 90 denotes the data track area.

In the method for manufacturing a magnetic recording medium shown in FIGS. 7A to 7F and 8, all figure patterns to be created in each of the divided areas can be transferred into a rectangular area, one side of which is 40 mm long at maximum and the other side of which is 30 mm long at maximum. That is, each of the divided areas 72 and 76 in FIGS. 7B and 7C can be a rectangle, one side of which is 40 mm long at maximum and the other side of which is 30 mm long at maximum. Each of the divided areas can be an arbitrary rectangle as long as it is a maximized rectangle within the above maximum size. The most desirable rectangular divided area is shaped in such a way that one side is 35 mm long and the other side is 25 mm long. The shape of the divided area is not limited to rectangular, but can be circular, elliptical, quadrangular, trapezoidal, rhomboid, square, and polygonal, as long as the shape is within the rectangular area having the above maximum size.

Although the number of divided areas is four in FIG. 8, it can be any of other numbers. Although the divided areas are disposed in line symmetry with respect to an arbitrary dividing line including the center of rotation in FIG. 8, the divided areas can be disposed in any other way. For example, the divided areas can be disposed in point symmetry or rotational symmetry with respect to the center of rotation. The divided areas can be disposed without the center of symmetry, unlike in point symmetry or line symmetry.

In FIGS. 7A to 7F and 8, the division is most desirably carried out in such a way that the sizes of the two or more divided areas are equal to one another. In the case of division into four, the diving lines are desirably disposed in such a way that the sizes of the four divided areas are equal to one another. Division into three or more can also be carried out in such a way that the sizes of at least two of the divided areas are equal to each other.

Figure 9:
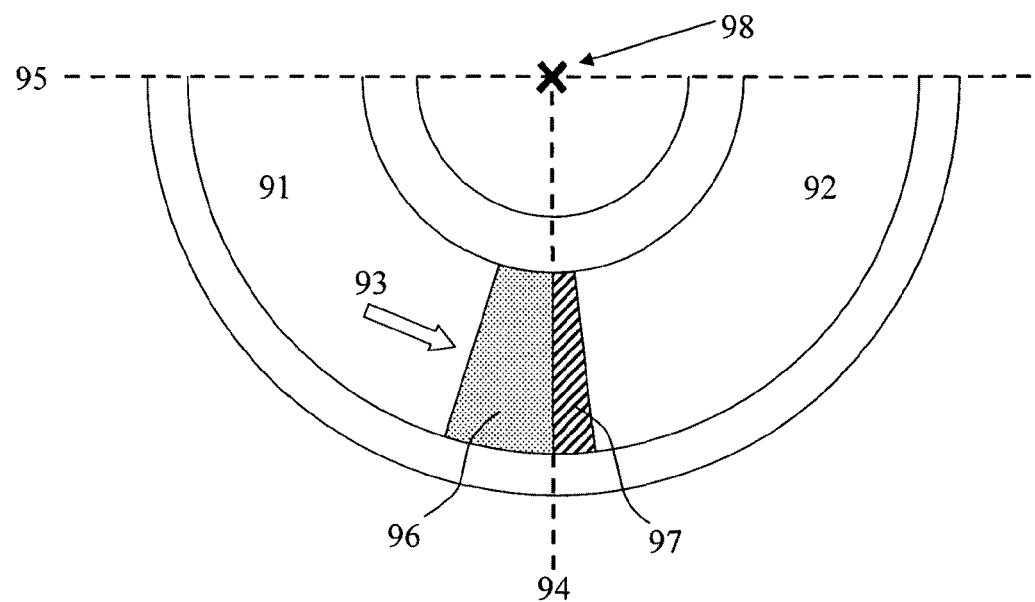
FIG. 9 is a schematic view of an example of pattern arrangement in divided areas.

In the method for manufacturing a magnetic recording medium of the present invention, the area division is carried out in such a way that a group of tracks that are concentric with respect to the center of rotation of the substrate and have a plurality of data areas and a plurality of servo areas are divided by an arbitrary line including the center of rotation, and the divided areas are desirably created in such a way that the end of one of two adjacent divided areas on one side of the dividing line is the terminal of an arbitrary data track area and the end of the other divided area is the start of an arbitrary servo area. The detail of this division is shown in FIG. 9 with reference to the case where the number of division is four. FIG. 9 shows two adjacent divided areas 91 and 92. The arrow 93 represents the direction in which the recording/reproducing head moves. When the recording/reproducing head moves from the divided area 91 to the divided area 92, it is desirable that the divided area 91 side of the dividing line 94 is the terminal of a data track area 96, and the divided area 92 side is the start of a servo area 97. The shape of the fine pattern in the data area in which magnetic information is recorded in the divided areas 91 and 92 is desirably a concentric or spiral discrete track structure. Alternatively, it is possible to use a dot-patterned structure having an indented structure in which adjacent recording bits formed on the same recording track are magnetically separated, and the projection and the indentation are a recording bit and the portion between recording bits, respectively.

Figure 10:
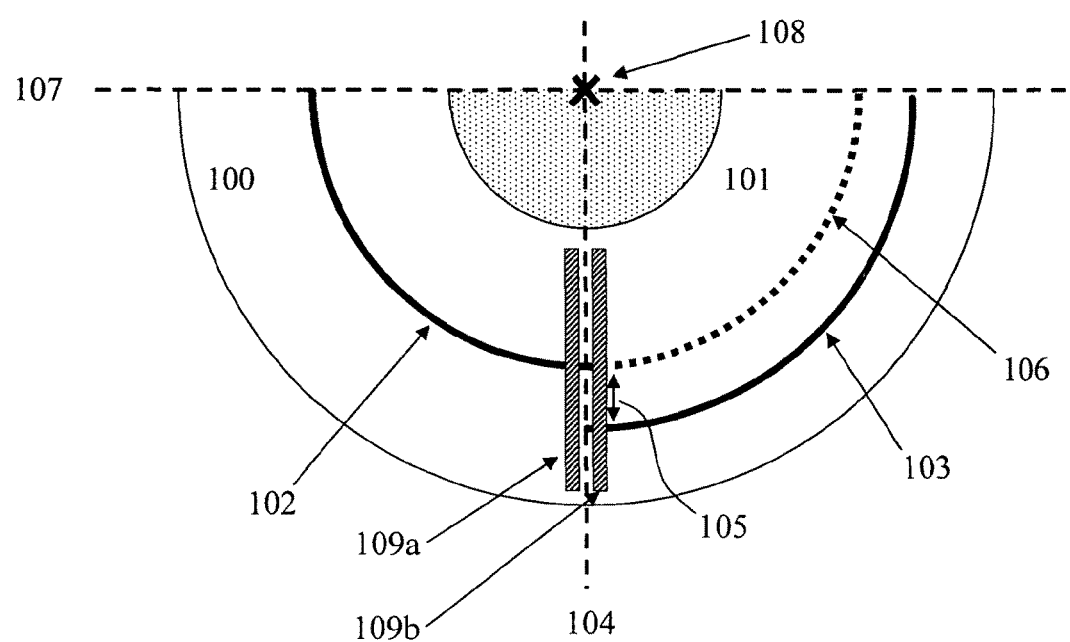
FIG. 10 is a conceptual view showing a relative shift between patterns disposed in divided areas.

In the method for manufacturing a magnetic recording medium of the present invention, the method for separately transferring the latent image of the figure pattern desirably is carried out in such a way that when the figure pattern on an arbitrary concentric track is divided into two adjacent areas, the amount of relative positional shift between the divided figure patterns is 100 nm or smaller in the radial direction or the circumferential direction. With reference to FIG. 10, consider the case where the pattern on the same track n extends over two divided areas 100 and 101. Since the pattern 102 on the track n in the divided area 100 and the pattern 103 on the track n in the divided area 101 are originally aligned on the same track, the amount of relative shift 105 between the patterns on opposite sides of the dividing line 104 is desirably zero. The amount of relative shift herein refers to how much the pattern 103 on the track n in the divided area 101 is relatively apart from the position 106 where the pattern 103 should be normally formed with reference to the pattern 102 on the track n in the divided area 100. In practice, when the pattern 102 on the track n in the divided area 100 and the pattern 103 on the track n in the divided area 101 are separately formed through separate exposure, it is conceivable that there is a positional shift between the patterns. In this case, the amount of shift is desirably 100 nm or smaller. Examples of the conceivable relative shift are, when the X$\theta$ coordinate system is set in the substrate plane, the offsets in the X direction and the $\theta$ direction. Another conceivable relative shift may result from difference in reduction rate. For example, the pattern on the track n in the divided area 101 is smaller or lager with reference to the pattern on the track n in the divided area 100. Furthermore, when a Z axis perpendicular to the substrate is considered as well as the X axis and the $\theta$ axis, a trapezoidal shift in which the pattern deforms in the Z axis direction is conceivable.

As described above, for a relative shift between the divided patterns in two areas, a detection pattern for detecting the amount of shift and measuring its relative value can be disposed at the end of each of the divided areas on opposite sides of the dividing line. FIG. 10 shows an example of the arrangement of detection patterns 109a and 109b. The detection patterns can be disposed in any other way.

Each of a plurality of masks used in separate exposure desirably has an alignment mark for relative alignment, when each of the masks is used in exposure, with the adjacent divided area previously exposed. The shape and arrangement of the alignment mark can be the shape and arrangement of a pattern used in fabrication of a semiconductor element. In a hard disk medium, the inner area close to a motor bearing for rotation is not used for recording and reproducing in many cases. The alignment mark can thus be created in the inner area.

In the pattern formation method of the present invention, photolithography is primarily used as the contactless transfer method. In KrF or ArF photolithography used to form a fine pattern for a semiconductor or a liquid crystal display, the time required for one exposure (one shot) often ranges from several tens of seconds to one minute including positioning and focusing for exposure. The size of a fine pattern that can be formed in one shot is within the rectangle described above, one side of which is 40 mm long at maximum, and the other side of which is 30 mm long at maximum. In a 1.8-inch diameter hard disk substrate, when the substrate is divided into four by two division lines perpendicular to each other with reference to the center of rotation of the substrate, the whole pattern can be transferred to the surface of the substrate in four exposure operations. The time required for such operations ranges from one to four minutes. When a 2.5-inch diameter hard disk substrate is divided into six, the whole pattern can be similarly transferred in six minutes. Since the time required for fine pattern formation using photolithography is thus significantly shorter than several days required for pattern formation in electron beam lithography, the throughput of resist pattern formation on the substrate is significantly high. The manufacturing cost of a patterned medium can thus be reduced, and there will be no problem of degradation in accuracy in pattern size due to the delay effect.

In a hard disk drive, the type and the shape of the servo pattern as well as the arrangement of the servo area on the substrate are part of important factors that determine the performance of the drive, so that the servo pattern is frequently changed as the recording density improves. Since the pattern formation method of the present invention is contactless pattern transfer using photolithography, necessary change when the servo pattern is changed is only the masks used in separate exposure. A patterned medium produced through the pattern formation method of the present invention has therefore an advantage of a reduced manufacturing cost.

When reduced projection exposure-based KrF or ArF photolithography is used, a mask having a pattern four times larger than the pattern on the actual substrate is used. Since the pattern on the mask is thus large, a resist process margin is easily provided when the pattern is fabricated on the mask by electron beam drawing or laser beam writing, so that there is provided a mask on which a desired figure pattern is formed with an accurate size. Since such a mask is used to carry out reduced projection exposure, pattern defects in the fine pattern formed on the substrate are advantageously minimized.

Furthermore, the method for manufacturing a magnetic recording medium uses a contactless pattern transfer method in which the mask on which a figure pattern to be transferred is drawn does not come into contact with the substrate onto which the pattern is transferred. Therefore, in contrast to contact pattern transfer represented by an imprinting method, there will not be a problem of pattern defects produced during mold (mask) separation, allowing pattern defects to be minimized.

Figure 1:
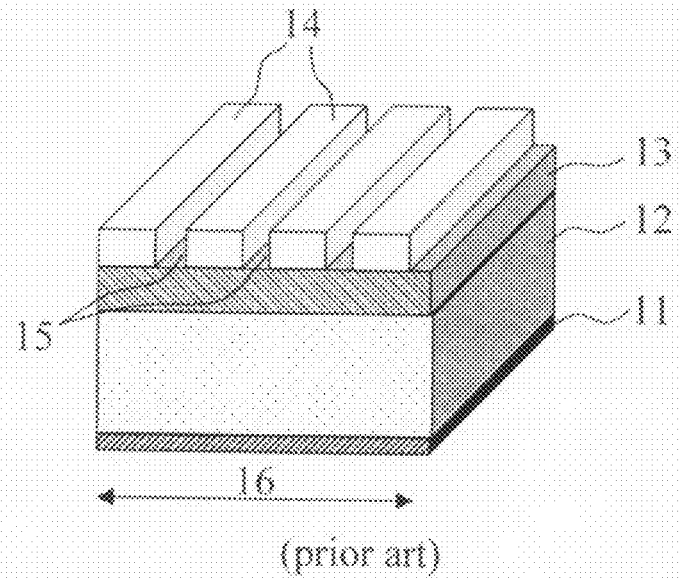
FIG. 1 is a schematic view of a discrete track medium.
Figure 2:
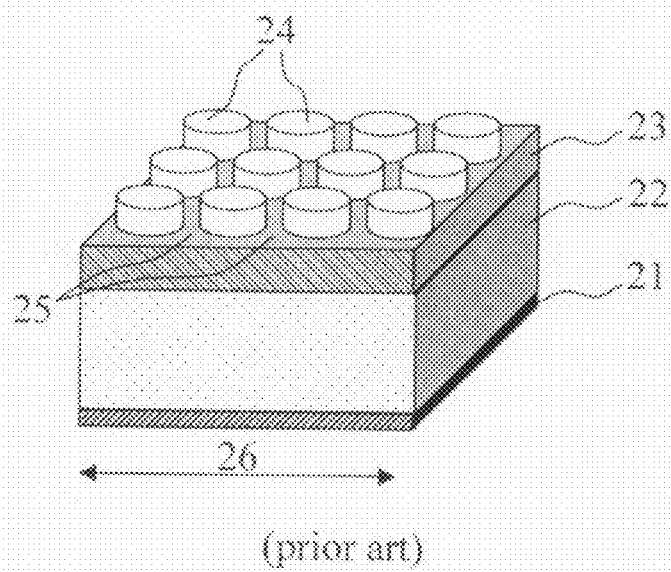
FIG. 2 is a schematic view of a dot-patterned medium.
Figure 3:
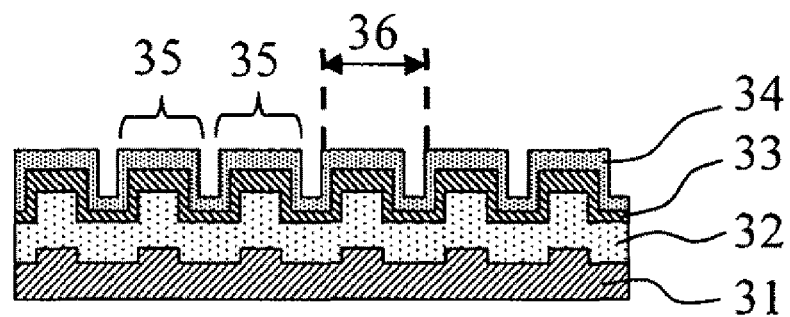
FIG. 3 is a schematic view of a patterned medium with patterns on a substrate surface.
Figure 4:
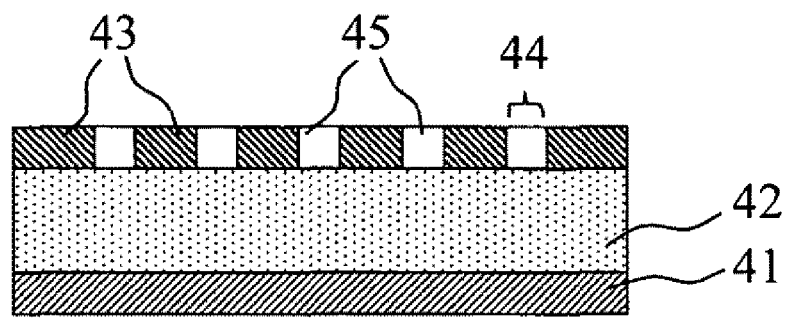
FIG. 4 is a schematic view of a patterned medium with patterns on a magnetic recording layer.

The method for manufacturing a magnetic recording medium according to the present invention can be used to fabricate both the patterned medium with patterns on a substrate surface shown in FIG. 3 and the patterned medium with patterns on a magnetic recording layer shown in FIG. 4. The fabrication method is schematically described below. The method shown in FIGS. 7A to 7F is used to form a resist pattern including the fine pattern corresponding to the data area or the servo area on the substrate or the cutting work layer, and the resist pattern is used as a mask to cut the substrate or the cutting work layer. The steps necessary for medium fabrication after the cutting step are similar to those in the conventional technology. For a patterned medium with patterns on a substrate surface, the pattern fabrication method of the present invention is used to form the resist pattern 62 in FIG. 6A. For a patterned medium with patterns on a magnetic recording layer, the pattern fabrication method of the present invention is used to form the resist pattern 55 in FIG. 5A.

The medium produced based on the method for manufacturing a magnetic recording medium according to the present invention can be used as a discrete track medium and a dot-patterned medium. Examples of the recording method used for the above medium may be perpendicular magnetic recording and optically or thermally assisted perpendicular magnetic recording.

When the discrete track medium produced through the method for manufacturing a magnetic recording medium according to the present invention is combined with a recording/reproducing head to perform perpendicular magnetic recording, an overcoat primarily containing carbon is desirably stacked on the magnetic recording layer by sputtering or the like. A lubricant made of a fluorine-based compound can also be applied onto the overcoat.

In a discrete track medium and a dot-patterned medium fabricated through the method for manufacturing a magnetic recording medium according to the present invention, the substrate surface of the medium is divided and a fine pattern is formed in each of the divided areas as described above. The pattern divided into two areas as described above may therefore suffer from a relative shift. It is possible to reduce the absolute value of the amount of shift to 30 nm or smaller by using liquid-immersion ArF lithography having the best resolution in the current reduced projection exposure method for volume production. However, since the recording track pitch used for the current recording density has already reached a 200 nm level or lower, it is considered that the shift corresponding to 15% or more of the track pitch greatly affects the positioning and servo control of the head. While such a positional shift is continuous in a conventional servo method, the shift produced in the pattern formation method of the present invention is continuous in each divided area as in the conventional method but discontinuous at the boundary between divided areas.

Even when such a discontinuous shift is produced, the problem can be eliminated by using a configuration in which the divided area 91 side on one side of the dividing line 94 is the terminal of the data track area 96 and the divided area 92 side is the start of the servo area 97, as shown in FIG. 9. That is, when the recording/reproducing head moves from the divided area 91 to the divided area 92 across the dividing line 94, it is desirable to position the head in the servo area 97 to measure the amount of the discontinuous shift produced by the dividing line 94. Similarly, for each boundary between the divided areas on the substrate, by measuring and learning the amount of the discontinuous shift and using the result in the servo control of the recording/reproducing head, it is possible to solve the problems of positioning and servo control of the head due to the discontinuous shift.

In the case described above, it is effective to use the positional shift detection patterns 109a and 109b shown in FIG. 10. The positional shift detection patterns can be disposed at the terminal of the data track area in the divided area 1 and the start of the servo area in the divided area 2, as shown in FIG. 10. In such an arrangement, the detection pattern 109a at the terminal of the data track area in the divided area 100 is first used to check the current position of the recording/reproducing head. Then, when the head enters the divided area 101, the detection pattern 109b at the start of the servo area is used to measure the amount of shift relative to the concentric extension located at the position that has been just measured. By thus disposing the detection patterns ahead of and behind the dividing line, it is possible to solve the problems of positioning and servo control of the head due to the discontinuous shift.

Even in the same divided area, it is fully expected that the amount of relative shift varies depending on the radial position where the shift occurs. Measuring and storing the amount of shift for each data track is considered to be inefficient. Therefore, the positional shift detection patterns are disposed at a plurality of radial positions along an arbitrary dividing line and the amount of relative shift at each of the radial positions is sampled and measured at the beginning of the use of the magnetic recording apparatus. It is then possible to create a correction curve for the shift on the arbitrary dividing line based on the measured values. By learning the correction curve, estimating the discontinuous positional shift for each divided area through feed forward control, and carrying out servo control accordingly, it is possible to provide positioning accuracy equivalent to that in a conventional recording/reproducing method. Use of this method eliminates the need to carry out the measurement of the amount of the discontinuous shift produced by the dividing line for each data track, but allows the measurement to be carried out for every several tracks or several tens of tracks, resulting in efficient recording/reproducing and servo information processing.

An example of the positional shift detection pattern described above may be a figure pattern indicative of the data track number and the data track center position. That is, figure patterns, each indicative of the data track number and the data track center position, are disposed ahead of and behind an arbitrary dividing line at a plurality of radial positions, and the reproducing head is first used to acquire these data. Since there will be a discontinuous shift that is not normally produced, the data track number and the data track center position ahead of the dividing line greatly differ from those behind the dividing line, which becomes the shift value. By creating a correction curve for the shift on the arbitrary dividing line based on these values, and performing feed forward control according to the correction curve during recording/reproducing so as to control the position of the recording/reproducing head, recording/reproducing can be carried out with positioning accuracy equivalent to that in a conventional recording/reproducing method.

In conventional magnetic recording, an arbitrary data track on the recording medium is divided into a plurality of, approximately 200, data areas and the same number of associated servo areas, and the servo pattern is read for every different data area to make a fine adjustment on the position of the recording/reproducing head in such a way that the recording/reproducing head can always be above the arbitrary data track during one rotation of the medium. This operation is continuously carried out throughout one rotation. Since the magnetic recording medium fabricated according to the present invention is fabricated through separate exposure, discontinuous areas occur multiple times, which corresponds to the number of division, during one rotation. Therefore, instead of conventionally performing servo control throughout one rotation, it is possible to employ a new servo method in which servo control is performed for each divided area. In this case, recording/reproducing is not carried out continuously during one rotation, but the conventional servo control is performed, for example, when four divided patterns are created, for each quarter of one rotation. That is, it is possible to employ a method in which recording/reproducing is carried out in an arbitrary divided area by making a fine adjustment on the position of the recording/reproducing head in the conventional servo method in such a way that the recording/ reproducing head can be always above a specific data track, and when the head enters a different divided area, the data track number is newly recognized and recording/reproducing is carried out by performing the servo control in such a way that the head is always above the data track having a number different from the previous one.

Figure 5A:
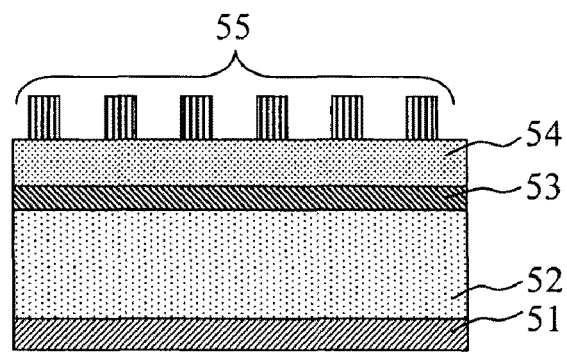
FIGS. 5A to 5C are schematic views showing how to fabricate a patterned medium with patterns on a magnetic recording layer.
Figure 5B:
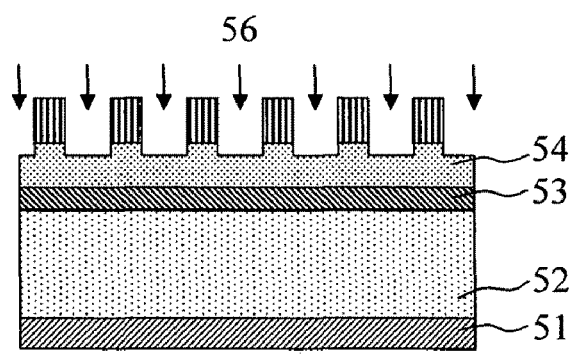
Figure 5C:
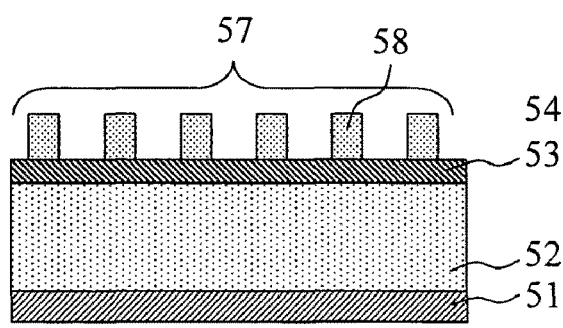
Figure 6A:
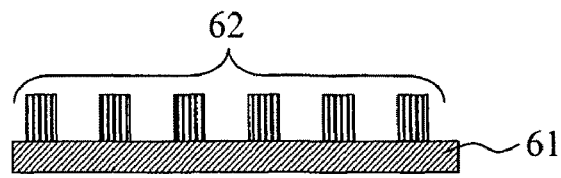
FIGS. 6A to 6D are schematic views showing how to fabricate a patterned medium with patterns on a substrate surface.
Figure 6B:
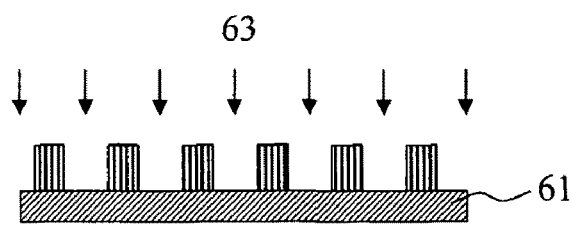
Figure 6C:
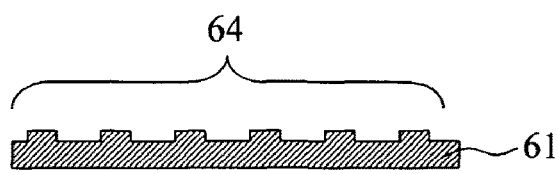

There has been described a method for directly forming a resist pattern, which is required for microprocessing a patterned medium, through the above-mentioned photolithographic separate exposure on the surface of the medium. The photolithographic separate exposure can also be used to fabricate a nanoimprinting mold. A nanoimprinting process using a mold having an indented pattern fabricated through photolithographic separate exposure can be an alternative to direct fine pattern formation through photolithography. That is, to fabricate a patterned medium with patterns on a substrate surface, the nanoimprinting method using such a mold is used to form the resist pattern 62 in FIG. 6A. Similarly, for a patterned medium with patterns on a magnetic recording layer, the resist pattern 55 in FIG. 5A is formed by the nanoimprinting method. Use of the nanoimprinting method allows further reduction in patterned medium manufacturing cost.

The medium fabricated by the nanoimprinting method using the mold described above can be used as a discrete track medium and a dot-patterned medium. Examples of the recording method used for the above medium may be perpendicular magnetic recording and optically or thermally assisted perpendicular magnetic recording. When the discrete track medium fabricated by the nanoimprinting method is combined with a recording/reproducing head to perform perpendicular magnetic recording, an overcoat primarily containing carbon is desirably stacked on the magnetic recording layer by sputtering or the like. A lubricant made of a fluorine-based compound can also be applied onto the overcoat.

When the fine pattern formation through photolithographic separate exposure according to the present invention is applied to mold formation, the substrate of the mold is desirably nonmagnetic, and has a layer made of at least one of quartz, glass, silicon monocrystal, silicon polycrystal, and silicon having an amorphous structure. The nonmagnetic substrate also desirably has a disk shape having an inner hole through which a rotating shaft is inserted, and the diameter of the nonmagnetic substrate and the diameter of the inner hole are the same as those of a 2.5 inch or 1.8-inch diameter hard disk substrate. It is also possible to use a substrate in which the shape of the mold is not circular but square or rectangular and the center of the arrangement of the fine pattern formed on the surface of the nonmagnetic substrate coincides with the center of the substrate. The mold desirably includes an alignment figure pattern to align the mold with a substrate to which the pattern is transferred at a predetermined position when the mold is used for imprinting.

When ArF or KrF lithography is used for mold fabrication, a mask having a pattern four times larger than the pattern on the mold is used. Since the pattern on the mask is thus large, a resist process margin is easily provided when the pattern is fabricated on the mask by electron beam drawing or laser beam writing, so that there is provided a mask on which a desired figure pattern is formed with an accurate size. Since such a mask is used to carry out reduced projection exposure using ArF or KrF lithography so as to transfer the pattern on the mask to the mold, pattern defects in the fine pattern formed on the mold are advantageously minimized.

The patterned medium fabricated by nanoimprinting using the mold possibly has a discontinuous shift due to a dividing line as described above. In this case, the problems in positioning the recording/reproducing head and performing servo control thereon can be solved in the same way as in the case where a fine pattern is directly formed on the surface of a magnetic recording medium through photolithography.

When the pattern formation method of the present invention is applied to the nanoimprinting mold fabrication method, use of photolithography to fabricate a fine pattern on the mold reduces the time required for pattern fabrication and allows cost reduction in not only mold fabrication but also medium fabrication.

The present invention will be more specifically described below, but the present invention is not in any way limited to the following examples.

Example 1

According to the method for fabricating a magnetic recording medium of the present invention, in creating a fine pattern for a patterned magnetic recording medium, an optical, contactless pattern transfer method is used to transfer the pattern in the data area in which magnetic information is recorded and the pattern in the servo area having servo information for the recording/reproducing head through masks including figure patterns corresponding to these patterns to the substrate surface in such a way that the latent images of the figure patterns are separately transferred for each of the masks. Among the reduced projection exposure methods currently used in volume production, photolithography using an ArF excimer laser having a wavelength of 193 nm as a light source is promising in terms of resolution as the optical, contactless pattern transfer method. First, an ArF scanner was used as an exposure apparatus to check the resolution for the fine pattern.

In the present invention, a plurality of masks having figure patterns different from one another are used to form a resist pattern on one substrate through several separate exposure processes. Therefore, relative shift may be produced between the divided patterns in two areas as described above. The amount of shift possibly affects the positioning and servo control methods of the recording/reproducing head. ArF lithography was therefore used to try to measure the amount of relative shift between the divided patterns as well.

First, as shown in FIG. 7A, the ArF positive resist layer 71 was formed on the 1.8-inch diameter hard disk silicon substrate 70 through a spin coat method. Then, the surface of the substrate was divided into four areas using the center of rotation of the substrate as the reference point. In the dividing method used in the above dividing process, the dividing line 83 crossed the dividing line 84 at right angles at the center of rotation 81, as shown in FIG. 8. It is noted that the four divided areas had the same size. The divided areas were created in such a way that the end of one of the divided areas on one side of the dividing line was the terminal of an arbitrary data area, and the end of the other divided area was the start of an arbitrary servo area. Then, as shown in FIGS. 7B and 7C, in the divided areas, four masks in total including figure patterns for the divided areas were used to transfer the figure patterns on the masks with the ArF scanner in such a way that latent images were separately formed on the resist layers in the divided areas. Each of the masks used in this process was a 4× mask having a pattern four times larger than the pattern to be formed on the substrate. In ArF photolithography, the maximum size (angle of view) formed in one exposure is a rectangle, one side of which is 25 mm long and the other side of which is 33 mm long. Each of the four divided areas was within this angle of view.

Figure 12:
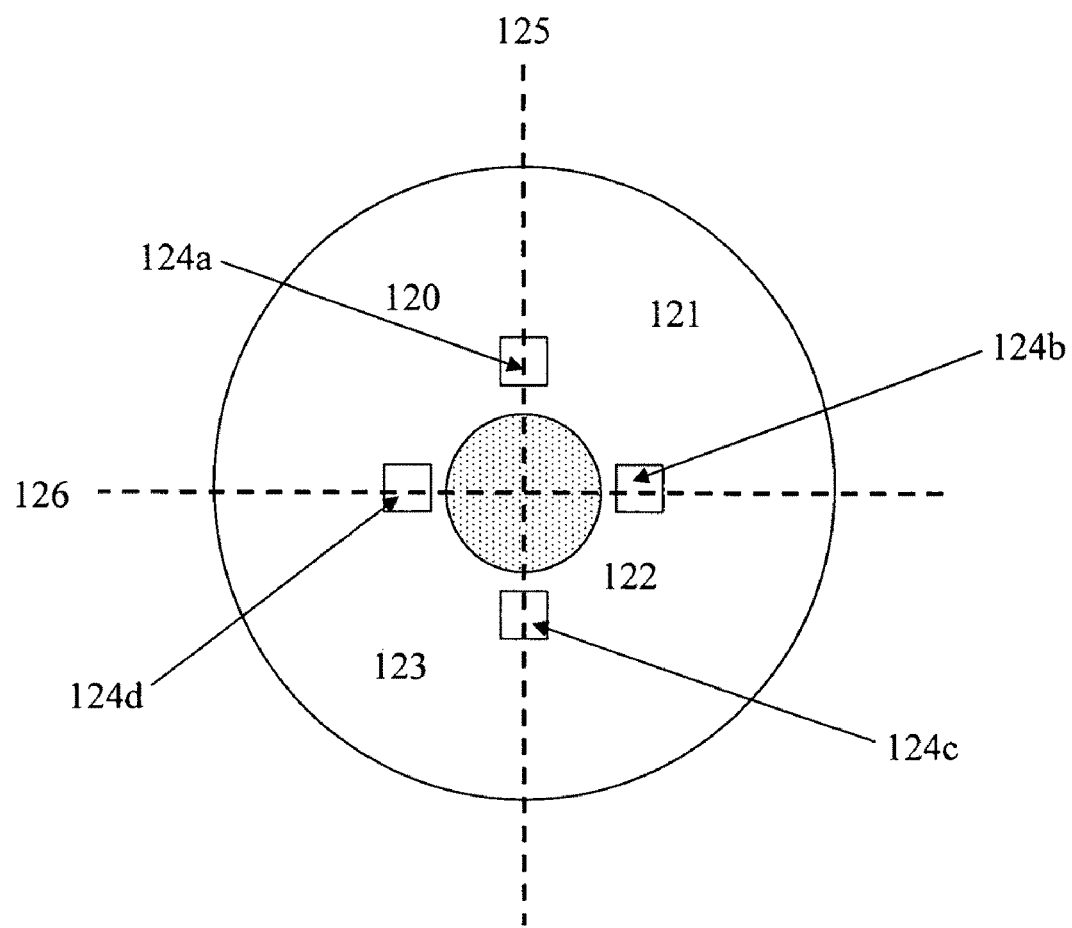
FIG. 12 is a conceptual view of showing the separate exposure method and the arrangement of alignment marks according to the present invention.

The actual exposure method is described with reference to FIG. 12. The 1.8-inch substrate was placed on the stage of the ArF scanner, and the stage was secured at a specific position. Then, the mask No. 1 having the divided pattern was used to perform ¼-reduced projection exposure of the pattern on the mask to the surface of the substrate. The resultant latent image of the pattern was created in the area indicated by reference numeral 120. Then, the stage was moved, and the mask No. 2 was used to expose the pattern on the mask to the substrate so as to transfer the latent image of the pattern on the mask No. 2 in the area indicated by reference numeral 121. Similarly, the latent images of the patterns on the masks No. 3 and No. 4 were transferred in the areas indicated by reference numerals 122 and 123. Each of the masks has an alignment mark to provide accuracy in superposition with the adjacent mask when the separate exposure was carried out. When the mask No. 1 was used to carry out the exposure, the alignment mark 124*a* was transferred at a radial position of 15 mm. When the pattern on the mask No. 2 was then transferred, the transferred alignment mark 124*a* was used as the target to align the mask No. 2. When the pattern on the mask No. 3 was transferred as well, the alignment mark 124*b* was used in a similar manner to perform fine adjustment on the position of the mask No. 3 for pattern transfer. In the transfer process using the mask No. 4 as well, the alignment mark 124*c* was used in a similar manner to perform fine adjustment on the position of the mask No. 4. After the pattern transfer processes for all the divided areas were completed, the entire resist layer 71 was developed to form the resist pattern 79 from the latent images of the figure patterns, as shown in FIG. 7D. The alignment marks were left as the resist pattern at the four radial positions of 15 mm on the substrate, as shown in FIG. 12. In this process, the fine pattern formed through the ArF lithography had a line/space (L/S) resolution of 120 nm/120 nm because conventional masks employing no super-resolution method were used. As shown in FIG. 10, it was found that the amount of relative positional shift 105 between the divided areas 100 and 101 across the dividing line 104 ranged from 30 to 50 nm.

Example 2

A 2.5-inch diameter hard disk silicon substrate was used to carry out an experiment similar to that in Example 1. In this experiment, the number of division was six and the division was carried out in such a way that the divided areas had the same size. A liquid-immersion ArF scanner was employed as the exposure apparatus, and a 4× mask employing a super-resolution method was used. As a result, it was found that the line/space (L/S) resolution was 50 nm/50 nm. It was also found that the amount of relative positional shift between the divided areas ranged from 20 to 30 nm.

Example 3

The ArF lithographic separate exposure verified in Example 1 was used to actually fabricate a patterned medium.

As shown in FIG. 7A, the ArF positive resist layer 71 was formed on the 1.8-inch diameter hard disk silicon substrate 70 through a spin coat method. Then, the surface of the substrate was divided into four areas using the center of rotation of the substrate as the reference point. In the dividing method used in the above dividing process, the dividing line 83 crossed the dividing line 84 at right angles at the center of rotation 81, as shown in FIG. 8. It is noted that the four divided areas had the same size. Then, as shown in FIGS. 7B and 7C, in the divided areas, masks including figure patterns for the divided areas were used to transfer the figure patterns on the masks with the ArF scanner in such a way that latent images were separately formed in the resist layers in the divided areas. Each of the masks used in this process was a 4× mask having a pattern four times larger than the pattern to be formed on the substrate. In ArF photolithography, the maximum size (angle of view) formed in one exposure is a rectangle, one side of which is 25 mm long and the other side of which is 33 mm long. Each of the four divided areas was within this angle of view. Each of the masks has an alignment mark to provide accuracy in superposition with the adjacent mask when the separate exposure was carried out. The position of the alignment mark was at a radial position of 15 mm.

After the pattern transfer processes for all the divided areas were completed, the entire resist layer 71 was developed to form the resist pattern 79 from the latent images of the figure patterns, as shown in FIG. 7D. The alignment marks were left as the resist pattern at the four radial positions of 15 mm on the substrate.

Then, as shown in FIG. 7E, the resist pattern 79 was used as a mask to perform reactive ion etching using a fluorine-based gas on the substrate. As a result, there was provided the substrate P, the entire surface of which the fine pattern N was transferred to, as shown in FIG. 7F. The data track pattern fabricated on the substrate had a satisfactory patterned indented structure in which the track pitch was 240 nm, and the width of the projection (land) corresponding to the recording track and the width of the indentation (groove) corresponding to the groove between the recording tracks were both 120 nm. The depth of the groove was 80 nm.

Figure 6D:
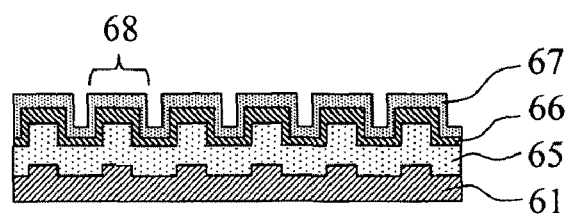

Then, the soft magnetic underlayer, the intermediate layer, and the magnetic recording layer primarily containing Co, Cr, and Pt were stacked in this order by sputtering. The discrete track medium with patterns on a substrate surface shown in FIG. 6D was thus provided. The total film thickness of the soft magnetic underlayer, the intermediate layer, and the magnetic recording layer was 100 nm.

Example 4

A discrete track medium with patterns on a magnetic recording layer was fabricated through a method similar to that in Example 3.

The soft magnetic underlayer, the intermediate layer, and the magnetic recording layer primarily containing Co, Cr, and Pt were stacked in this order by sputtering on a 1.8-inch diameter hard disk silicon substrate. The total film thickness of the soft magnetic underlayer, the intermediate layer, and the magnetic recording layer was 80 nm. Then, an ArF positive resist layer was formed on the magnetic recording layer through a spin coat method. Then, the surface of the substrate was divided into four areas using the center of rotation of the substrate as the reference point. In the dividing method used in the above dividing process, the dividing line 83 crossed the dividing line 84 at right angles at the center of rotation 81, as shown in FIG. 8. It is noted that the four divided areas had the same size. Then, as shown in FIGS. 7B and 7C, in the divided areas, masks including figure patterns for the divided areas were used to transfer the figure patterns on the masks with the ArF scanner in such a way that latent images were separately formed in the resist layers in the divided areas. Each of the masks used in this process was a 4× mask having a pattern four times larger than the pattern to be formed on the substrate. In ArF photolithography, the maximum size (angle of view) formed in one exposure is a rectangle, one side of which is 25 mm long and the other side of which is 33 mm long. Each of the four divided areas was within this angle of view. After the pattern transfer processes for all the divided areas were completed, the entire resist layer 71 was developed to form the resist pattern 79 from the latent images of the figure patterns, as shown in FIG. 7D. Then, as shown in FIG. 7E, the resist pattern 79 was used as a mask to perform Ar ion milling on the magnetic recording layer. As a result, there was provided the magnetic recording layer P in which the fine pattern N was transferred to the entire surface of the substrate, as shown in FIG. 7F. The data track pattern fabricated in the magnetic recording layer had a satisfactory patterned indented structure in which the track pitch was 240 nm, and the width of the projection (land) corresponding to the recording track and the width of the indentation (groove) corresponding to the groove between the recording tracks were both 120 nm. The depth of the groove was 30 nm.

Example 5

A nanoimprinting mold was fabricated through a method similar to that in Example 3. The ArF positive resist layer 71 was formed on the 1.8-inch diameter quartz mold substrate 70 through a spin coat method, as shown in FIG. 7A. Then, the surface of the substrate was divided into four areas using the center of rotation of the substrate as the reference point. In the dividing method used in the above dividing process, the dividing line 83 crossed the dividing line 84 at right angles at the center of rotation 81, as shown in FIG. 8. It is noted that the four divided areas had the same size. Then, as shown in FIGS. 7B and 7C, in the divided areas, masks including figure patterns for the divided areas were used to transfer the figure patterns on the masks with the ArF scanner in such a way that latent images were separately formed in the resist layers in the divided areas. Each of the masks used in this process was a 4× mask having a pattern four times larger than the pattern to be formed on the substrate. In ArF photolithography, the maximum size (angle of view) formed in one exposure is a rectangle, one side of which is 25 mm long and the other side of which is 33 mm long. Each of the four divided areas was within this angle of view. After the pattern transfer processes for all the divided areas were completed, the entire resist layer 71 was developed to form the resist pattern 79 from the latent images of the figure patterns, as shown in FIG. 7D. Then, as shown in FIG. 7E, the resist pattern 79 was used as a mask to perform reactive ion etching using a fluorine-based gas on the substrate. As a result, there was provided the quartz substrate P, to which the fine pattern N was transferred, as shown in FIG. 7F. The data track pattern fabricated on the substrate had a satisfactory patterned indented structure in which the track pitch was 240 nm and the width of the projection (land) corresponding to the recording track and the width of the indentation (groove) corresponding to the groove between the recording tracks were both 120 nm. The depth of the groove was 120 nm.

Example 6

The mold fabricated in Example 5 was used to create a fine pattern for a patterned medium through a nanoimprinting method. The substrate to which the fine pattern was transferred was a 1.8-inch diameter glass hard disk substrate. An SiO$_2$ layer was formed by sputtering on both sides of the glass substrate to a thickness of 100 nm for effective dry etching in the following process.

As a result of the nanoimprinting, there was formed a resist layer having a satisfactory patterned indented structure in which the track pitch was 240 nm and the land width and the groove width were both 120 nm. The resist pattern was used as a mask to perform reactive ion etching using a fluorine-based gas on the substrate. As a result, a fine pattern in which the land width and the groove width were both 120 nm and the track pitch was 240 nm was formed on the entire surface of the substrate. The depth of the groove was 80 nm.

Then, the soft magnetic underlayer, the intermediate layer, and the magnetic recording layer primarily containing Co, Cr, and Pt were stacked in this order by sputtering. The discrete track medium with patterns on a substrate surface shown in FIG. 6D was thus provided. The total film thickness of the soft magnetic underlayer, the intermediate layer, and the magnetic recording layer was 100 nm.

Example 7

The discrete track medium with patterns on a magnetic recording layer fabricated in Example 4 was provided with an overcoat primarily containing carbon, onto which a fluorine-based lubricant was applied. The discrete track medium was thus converted into a discrete track medium for evaluation. Then, a vibrating sample magnetometer was used to evaluate magnetic characteristics. As a result, there was provided a magnetization curve showing good magnetic characteristics including a perpendicular coercive of 200 kA/m (2500 Oe), a coercive squareness S* of 0.75, and a remnant magnetization of 100 emu/cc. The pattern fabrication method of the present invention was thus used to successfully fabricate a discrete track perpendicular magnetic recording medium showing the good magnetic characteristics.

The discrete track medium was combined with a head which has a read element and a write element using a thin film single pole head for perpendicular magnetic recording as a recording head and a GMR element as a reproducing head to examine the output from the reproducing head using a spin stand. As a result, a peak-to-peak output of approximately 1 mV was successfully obtained when the recording density was 100 kfci. It is found that the wearing resistance is similar to that of a conventional sputtered medium.

Figure 11:
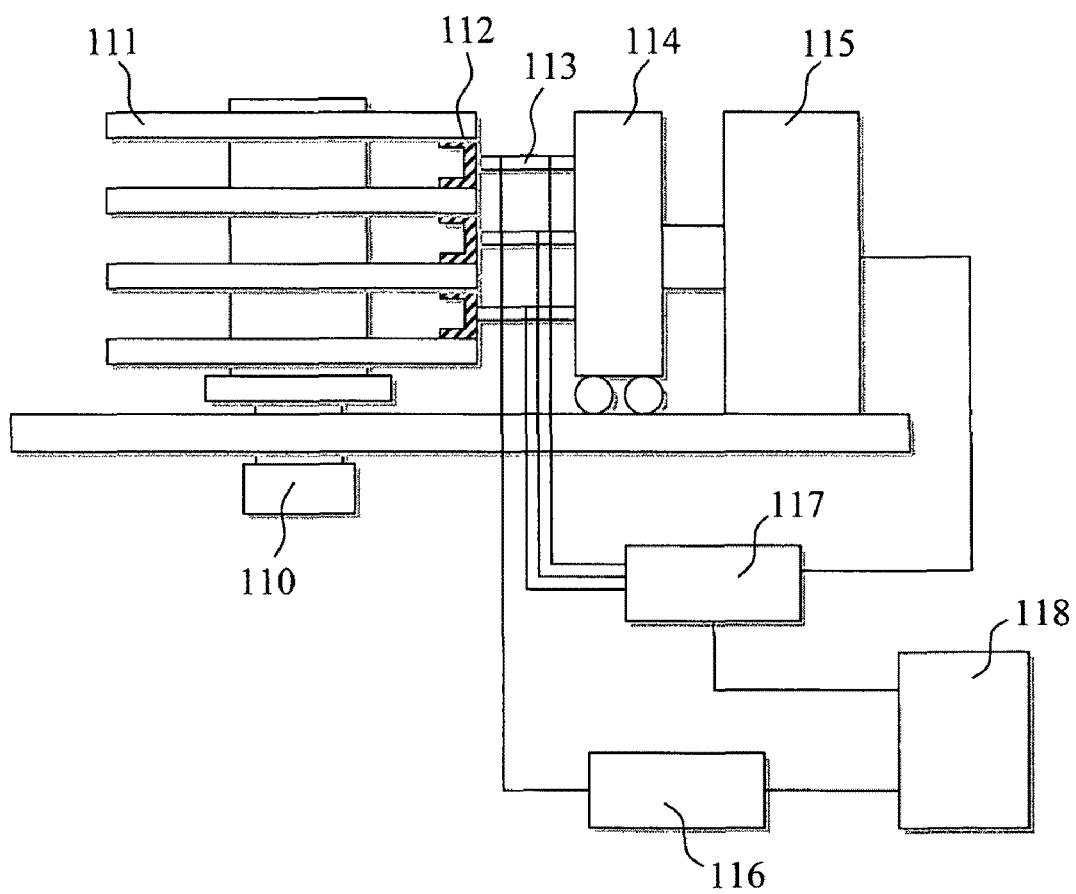
FIG. 11 is a schematic view of a magnetic disk apparatus according to the present invention.

The discrete track medium was combined with the head having a read element and a write element described above to assemble a magnetic disk apparatus schematically shown in FIG. 11. The read head used in this assembly had a narrow width than that of the data track in the discrete track medium. The width of the read head herein means the width of magnetic sensitivity. In FIG. 11, reference numeral 110 denotes a motor that drives the recording medium. Reference numeral 111 denotes a magnetic disk, which is the recording medium. Reference numeral 112 denotes a magnetic head having a read portion and a write portion. Reference numeral 113 denotes a suspension on which the head is mounted. Reference numerals 114 and 115 denote an actuator and a voice-coil motor involved in driving and positioning of the magnetic head. Reference numeral 116 denotes a write/read circuit. Reference numeral 117 denotes a positioning circuit. Reference numeral 118 denotes an interface control circuit.

The discrete track medium was expected to have a discontinuous positional shift resulting from the separate pattern formation. Therefore, the positional shift detection patterns formed on the substrate in advance were used to measure the amount of positional shift. The used detection pattern was a figure pattern indicative of the data track number and the data track center position. The division had been carried out in such a way that the end of one of the divided areas on one side of the dividing line was the terminal of an arbitrary data area, and the end of the other divided area was the start of an arbitrary servo area. Therefore, the figure patterns were disposed in all tracks at the terminal of the data area and the start of the servo area on opposite sides of the dividing line. The positional shift was measured in such a way that the read/write head in a certain divided area was above the center of the track indicated by the track number N.

When the head entered another divided area across the dividing line, the signals from the positional shift detection patterns were measured to find that the read/write head was apart from the center of the track with the track number N by 40 nm on the inner side due to the discontinuous shift. It is therefore found that the amount of discontinuous positional shift at the track with the track number N located in a specific radial position along the dividing line was 40 nm. By setting positional shift measurement points at 1 mm intervals on all dividing lines from radial positions of 16 mm to 28 mm, the amount of positional shift at each of the measurement points was measured through a method similar to that described above to create a correction curve. As a result, the amount of positional shift ranged from 30 nm at minimum to 100 nm at maximum. The servo control was carried out by learning the correction curve and following the correction curve during the read/write processes to position the read/write head using a feed forward method. As a result, although the discrete track medium had a discontinuous positional shift on each of the dividing lines, there was provided servo following characteristics similar to those of a perpendicular magnetic recording medium to which a servo track writer was used to write a servo pattern.

Comparative Example 1

In the discrete track medium used in Example 7, the division was carried out in such a way that the end of one of the divided areas on one side of the dividing line was the terminal of an arbitrary data area, and the end of the other divided area was the start of an arbitrary servo area. In contrast, the discrete track medium fabricated in Comparative Example 1 had a pattern divided in such a way that the dividing line was in a specific data track area. Although the division may cause a discontinuous positional shift, figure patterns for measuring the amount of positional shift were not disposed on opposite sides of the dividing line to compare Comparative Example 1 with Example 7.

This medium was combined with the head having a read element and a write element described above to assemble the magnetic disk apparatus schematically shown in FIG. 11 as in Example 7. An attempt of servo control on read/write operations performed by the magnetic head resulted in losing the positional information of the head due to a discontinuous shift, immediately after the head above a specific track entered the another divided area across the dividing line. Therefore, servo following characteristics similar to those of the perpendicular magnetic recording medium in Example 7 were not provided.

What is claimed is:

1. A method for manufacturing a magnetic recording medium including a magnetic recording layer having a patterned indented structure, the method comprising the steps of:

forming a resist layer on a disk-shaped substrate having a center of rotation or a cutting work layer including a metallic layer or a nonmetallic layer formed on the substrate;

dividing a surface of the substrate into a plurality of divided areas having a plurality of servo areas and a plurality of data areas using the center of rotation as a reference point and sequentially transferring latent images of patterns formed on masks to resist layers in the divided areas using an optical, contactless pattern transfer method, the patterns on the masks being patterns in data and servo areas corresponding to the divided areas, wherein the masks are contactless to the resist layers and the patterns formed on the masks are larger than the patterns formed on the resist layers;

wherein a terminal pattern of the data area is formed in an end area of a first of two divided areas adjacent in a circumferential direction of the substrate, the end area of the first divided area being adjacent to a second of the two divided areas;

wherein a start pattern of the servo area is formed in an end area of the second divided area, the end area of the second divided area being adjacent to the first divided area, a moving direction of a recording/reproducing head is from the data area of the first divided area to the servo area of the second divided area;

wherein the terminal pattern and the start pattern is for detecting the amount of shift in the radial direction of the substrate between the terminal pattern and the start pattern adjacent to each other across a boundary between the first divided area and the second divided area; and wherein the plurality of divided areas are disposed to be rotationally symmetric with respect to the center of rotation of the substrate;

developing the resist layers to form a resist pattern over the resist layers; and using the resist pattern as a mask to cut the surface of the substrate or the cutting work layer formed on the substrate.

2. The method for manufacturing a magnetic recording medium according to claim 1, wherein the cutting work layer includes a perpendicular magnetic recording layer.

3. The method for manufacturing a magnetic recording medium according to claim 1, wherein the data area has a patterned indented structure having projections and indentations, the projection corresponding to the position of a data track in which magnetic information is recorded and the indentation corresponding to the position between the data tracks, the repetition period of the projection and the indentation being equal to the track pitch of the data tracks.

4. The method for manufacturing a magnetic recording medium according to claim 1, wherein the data area has a patterned indented structure having projections and indentations, the projection corresponding to the position of a recording bit and the indentation corresponding to the position between the recording bits.

5. The method for manufacturing a magnetic recording medium according to claim 1, wherein the divided areas have the same size.

* * * * *